Aug. 29, 1933.  R. V. GRAYSON ET AL  1,924,988
QUICK FREEZING SYSTEM
Filed Dec. 16, 1931   7 Sheets-Sheet 1

Inventors
R. V. Grayson and
E. G. Ballenger
By Mason Fenwick&Lawrence
Attorneys

Aug. 29, 1933.  R. V. GRAYSON ET AL  1,924,988

QUICK FREEZING SYSTEM

Filed Dec. 16, 1931  7 Sheets-Sheet 3

Inventors
R. V. Grayson and
E. G. Ballenger
*Mason Fenwick Lawrence*
Attorneys

Aug. 29, 1933.  R. V. GRAYSON ET AL  1,924,988
QUICK FREEZING SYSTEM
Filed Dec. 16, 1931   7 Sheets-Sheet 4

Inventors
R. V. Grayson
and E. G. Ballenger
By Mason Fenwick & Lawrence Attorneys Aug. 29, 1933.    R. V. GRAYSON ET AL    1,924,988
QUICK FREEZING SYSTEM
Filed Dec. 16, 1931    7 Sheets-Sheet 5

Inventor
R. V. Grayson
and E. G. Ballenger
By Mason Fenwick&Lawrence
Attorneys

Patented Aug. 29, 1933

1,924,988

UNITED STATES PATENT OFFICE 1,924,988

QUICK FREEZING SYSTEM

Ralph V. Grayson and Edgar G. Ballenger, Atlanta, Ga.; said Grayson assignor to Patent and Security Holding Corporation, Tampa, Fla., a corporation of Florida Application December 16, 1931
Serial No. 581,451

17 Claims. (Cl. 62—104)

This invention relates to the quick freezing of perishable products, especially foodstuffs and has for its general objects the provision of methods and apparatus for the continuous quick freezing of packaged perishables, or the continuous freezing of unpackaged small units of the product which are then packed into a large bulk package, the interstices filled with liquid and the whole frozen into an integral block through the reflex chilling of the matrix liquid by the frozen units themselves.

Another object of the invention is the provision of a continuous freezing system in which the product in thin walled receptacles which may be paper, is subject to heat exchange with the liquid freezing medium directly through the walls of the receptacles.

A further object of the invention is to provide a method and apparatus for continuous refrigeration, by causing the objects to be frozen to travel through circulating brine or air, the freezing medium being chilled by passing in heat exchanging relation with respect to carbon dioxide ice or snow. When snow is employed, it may be formed in situ in the region of heat exchange.

Still another object of the invention is the provision of a flexible belt with molded cups for receiving the product to be frozen, and passing in refrigerating relation to the brine or air, and being deformed at the end of the freezing phase of its cycle so as automatically to eject the frozen units.

Another object of the invention is the provision of brine or air tunnels of such shape as to form between them valleys of downwardly convergent cross section adapted to be charged with carbon dioxide ice, which in growing smaller as it evaporates, maintains contact with said walls as it settles in said valleys by virtue of their shape.

A further object of the invention is the construction of apparatus for effecting efficient heat exchange between the brine or air and the carbon dioxide, comprising tunnels of preferably triangular cross section and undulating laterally whereby not only to present maximum surface to the refrigerating medium but having the undulating walls thereof assume the role of baffles for bringing the medium to be refrigerated into more intimate contact with the surface of said walls.

Other objects of the invention will appear as the following description of preferred and practical embodiments thereof proceeds.

In the drawings which accompany and form a part of the following specification and in which the same characters of reference have been used throughout the several figures to designate identical parts.

Referring now in detail to the several figures and first adverting to that form of the invention shown in Figures 1 to 9, inclusive, the numeral 1 represents a brine tank through which packaged products 2 to be frozen are made to travel by means of a conveyor 3, the speed of the conveyor being regulated so that by the time the packages have traversed the brine bath the products are in frozen state.

The packages may be of any suitable size or shape and the receptacles may be of any suitable material. Beneath the brine tank 1 is a series of tunnels 4 through which the brine circulates and is refrigerated. In order to present the brine to the action of the refrigerant in the form of a relatively thin layer or film, the tunnels are provided with interior cores 5 conforming in cross-sectional shape to that of the tunnels. The brine flows through the space between the walls 6 of the cores and the outer walls 7 of the tunnels. In the present instance the tunnels are of triangular cross section and they are arranged side by side so as to provide valleys in between, whose sides converge toward the bottoms of said valleys. The valleys are designed to be charged with a suitable refrigerant. In the present instance carbon dioxide ice is selected and blocks of the carbon dioxide ice are sawed in two, diagonally forming wedge-shaped blocks which fit the shape of the valleys. As the blocks grow smaller through evaporation they settle lower in the valleys, the surfaces of said blocks maintaining intimate contact with the sides of said valleys. It is apparent that the triangular shape of the tunnels produces the most efficient heat-interchanging conditions with respect to the refrigerant.

Figures 4, 8, 9:
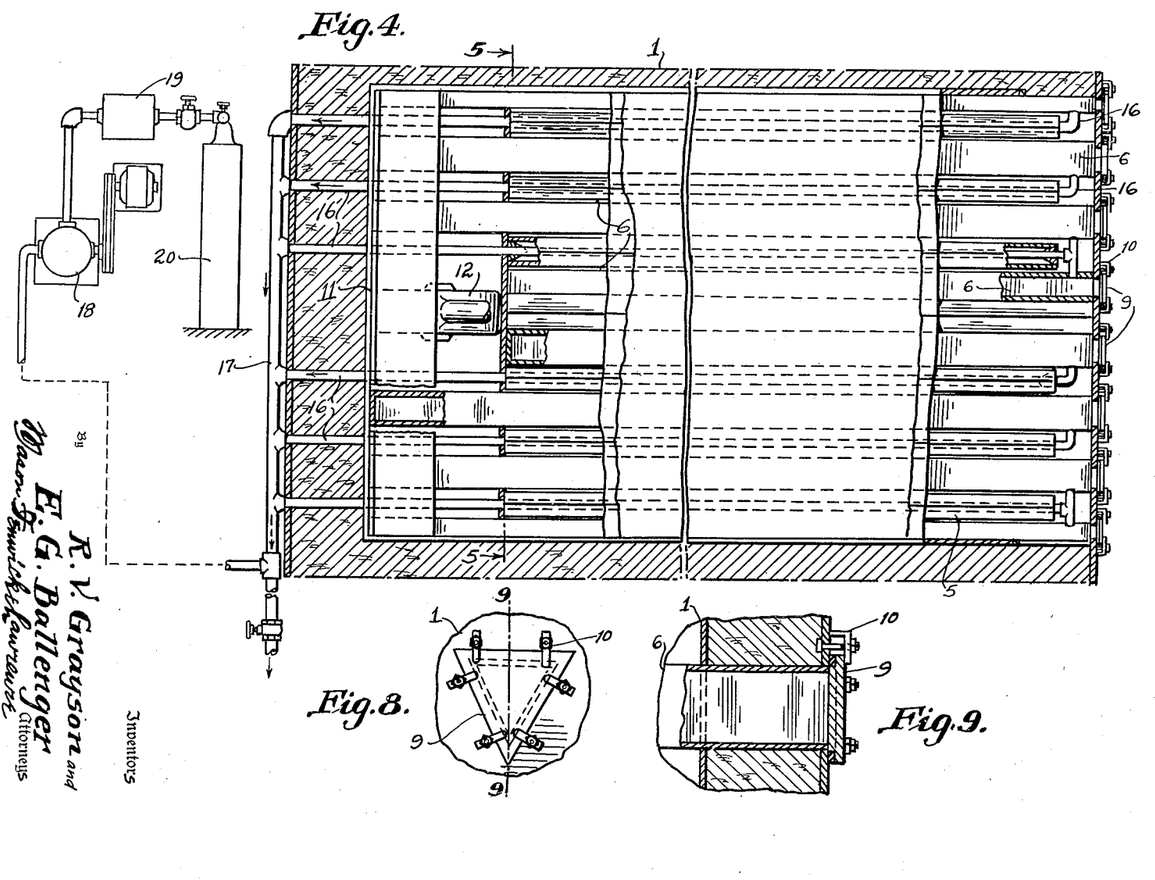
Figure 4 is a plan view partly in section indicating the means for regenerating the carbon dioxide.
Figure 8 is an end view of the door of one of the carbon dioxide tunnels.
Figure 9 is a longitudinal section taken along the line 9—9 of Figure 8.

Figures 8 and 9 show details of construction, the former figures showing a door 9 adapted to close the ends of the valleys. This door is held in place by suitable closure fasteners such as the cleats 10. By removing the doors the blocks of carbon dioxide may be pushed end-wise into the valleys. It is of course understood that while blocks of carbon dioxide ice of triangular cross section are preferred, the ice may be of any irregular shaped or sized pieces.

Figure 1:
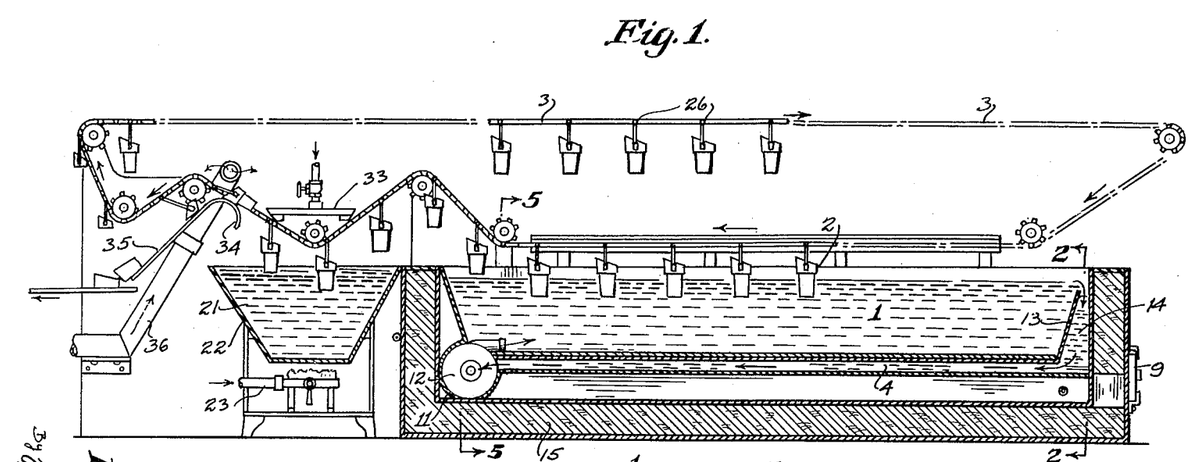
Figure 1 is a longitudinal vertical section, somewhat diagrammatic of a continuous quick freezing system embodying the principles of the present invention.
Figure 2:
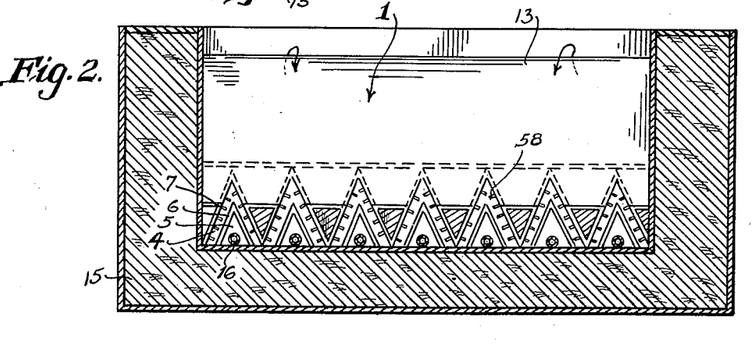
Figure 2 is a cross section taken along the line 2—2 of Figure 1.
Figure 3:
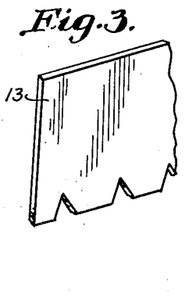
Figure 3 is a perspective view showing a detail of construction.

Figure 1 shows that the brine circulates through the tunnels 4, discharging into a header 11 at one end. A pump 12 in said header picks up the refrigerated brine and discharges it into the brine tank 1. The opposite end of said brine tank is provided with a baffle 13 terminating at a suitable distance below the top of said brine tank by means of which a constant level of brine is maintained in said tank. The spent brine overflows said baffle into a header 14 with which the opposite ends of the tunnels 4 communicate. Figures 1 and 2 illustrate an embodiment of the invention in which the floor of the brine tank 1 rests upon the apices of the tunnels 4. This is only an exemplary construction and it is to be understood that the brine tank may be supported in any suitable manner and may have any other positional relation to the tunnels, as may be desired. The entire unit comprising the brine tank refrigerating tunnels and appurtenant mechanism is preferably lagged by a heavy layer of insulation indicated at 15 in Figure 1.

Figure 5:
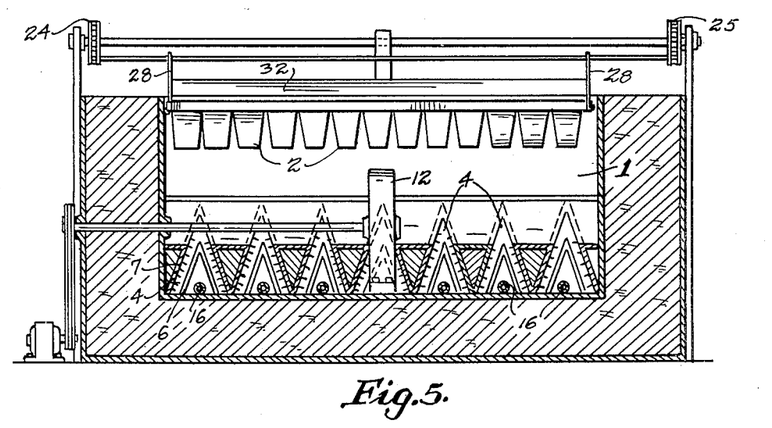
Figure 5 is a vertical section taken on the line 5—5 of Figure 4.
Figure 6:
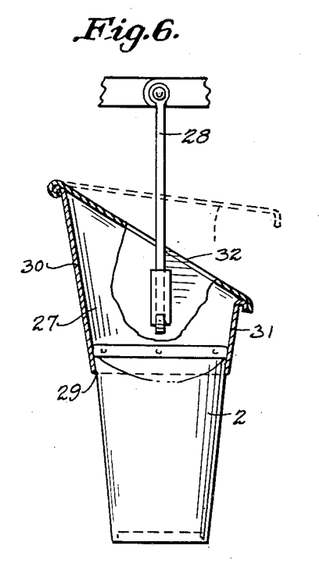
Figure 6 is a side elevation partly in section of one of the conveyor racks.
Figure 7:
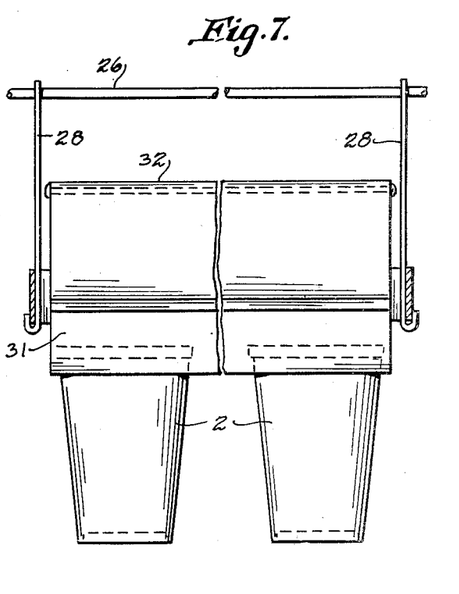
Figure 7 is a front elevation of one of said racks, part being broken away.

Means may be provided for regenerating the carbon dioxide. Such means are shown in Figures 2, 4 and 5, comprising pipes 16 opening into the carbon dioxide valleys or troughs at one end, as shown in Figure 4 and, for convenience extending through the cores 5 of the tunnels as shown in Figures 2 and 5. Said pipes communicate with a manifold 17 which leads to a compressor 18 in which the gaseous carbon dioxide eventuating from the evaporation of the ice is compressed and from it is discharged into a condensor 19 where it is liquefied and stored as a liquid in the tank 20.

The carbon dioxide troughs or valleys are preferably so sealed against atmospheric leakage that there is but little dilution of the carbon dioxide gas.

In Figure 1, which shows diametrically an entire quick freezing system, the packages 2 of the product to be frozen are drawn by the conveyor 3 first through the brine and then elevated so as to clear the brine tank and then depressed so that the package is dipped into a bath of water 21 in a tank 22, which may be suitably heated if found necessary from any source such as the burner 23.

The conveyor preferably comprises spaced chains 24 and 25, to which no novelty is ascribed, passing over suitable sprockets. The chains support at intervals, transverse bars 26 from which are suspended the racks 27, best shown in Figures 6 and 7. Said racks are preferably in the form of enclosures extending substantially the width of the brine tank and having links 28 at their outer sides pivotally connected to the transverse bars 26. Said racks are provided with a series of apertures 29 in the bottom walls thereof through which project the major portions of the packages 2. The packages are preferably tapered more or less and the racks 27 have the side walls thereof correspondingly tapered so that when the packages are inserted through the apertures 29 they jam against the side walls of the rack so that they will not fall entirely through. The size of the holes is so apportioned relative to the packages as to cause the latter to form a substantial seal against leakage of the brine into the interior of the enclosures forming the racks. The forward wall 30 of the rack is preferably made somewhat higher than the rearward wall 31, so that the wave of liquid in advance of the rack, caused by the travel of the same through the brine, will not overflow the top of the rack. The hinged lid 32 preferably closes the top of the rack and swings freely to an open position when the rack, together with the package of frozen product is upset.

The object of the water bath 21 is to defrost the contacting surfaces of the package and rack, and it will be observed that the rack dips sufficiently into the water bath to immerse the lower part of said rack, but not sufficiently to create a risk of the water entering the top of the rack. If desired, a spray of pure water may be directed upon the racks and packages for removing any vestige of brine. Figure 1 shows a rose 23 for providing such a spray.

After the racks have emerged from the water bath they are elevated in such a way as to come in contact with the inverter 34. This may be of any suitable shape or construction, its sole object being to upset the racks so as to permit the gravital discharge of the packages of frozen product whose adherence to the racks has been loosened by the melting action of the water bath. The inverter is in advance of a chute 35 down which the frozen packages slide when discharged from the inverted racks. The racks then proceed upwardly on the conveyor back to the point of beginning, fresh packages of the product to be frozen being supplied to them at some point in their return course. Figure 1 shows that a dry-air blast from a suitable conduit 36 may be blown upon the packages adjacent the point of discharge from the racks, for drying them so that they will not freeze together later, in cold storage.

The freezing of foodstuffs and other products in large bulk packages is ordinarily difficult to accomplish owing to the thickness of the mass of the product, and the fact that the freezing begins with the outside and that as soon as a thin film of the product has been frozen it acts as an insulator, retarding the transmission of heat from the innermost parts of the mass. Under ordinary methods of freezing, therefore, it is impracticable to freeze large masses in bulk on account of the inordinate amount of time required for the freezing operation, and then with the risk that the core portion of the mass will be imperfectly frozen.

Figure 15:
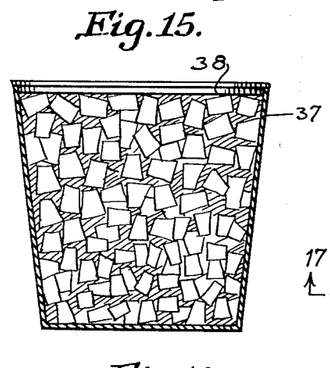
Figure 15 is a vertical section through a bulk container loaded with small frozen units.

The present invention proposes the freezing of small, unpackaged units of the product and the aggregating of these in a large bulk package. Figure 15 illustrates this concept, the numeral 37 designating a large container, the same being packed with the small frozen units 38. The intersticial spaces between the units are filled with a liquid, which may be a syrup of the frozen product, and the temperature of the small units is relied upon to freeze the liquid or syrup, binding the small units together into an integral frozen mass.

Figure 10:
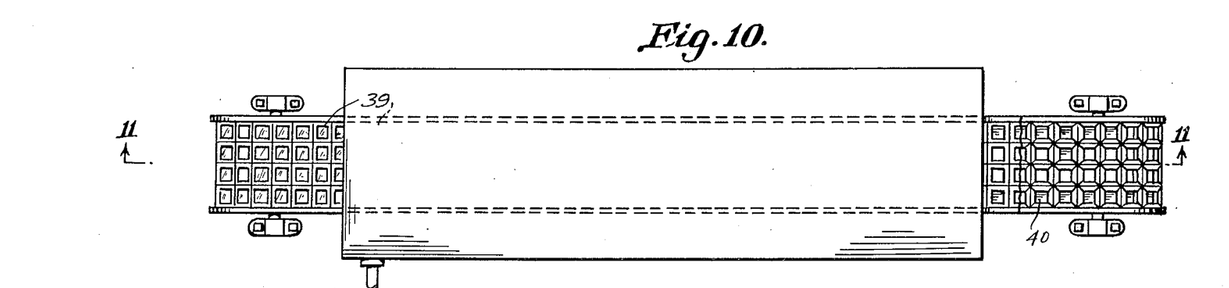
Figure 10 is a plan view of a modified form of the invention showing the endless belts with molded cups.
Figures 11, 12:
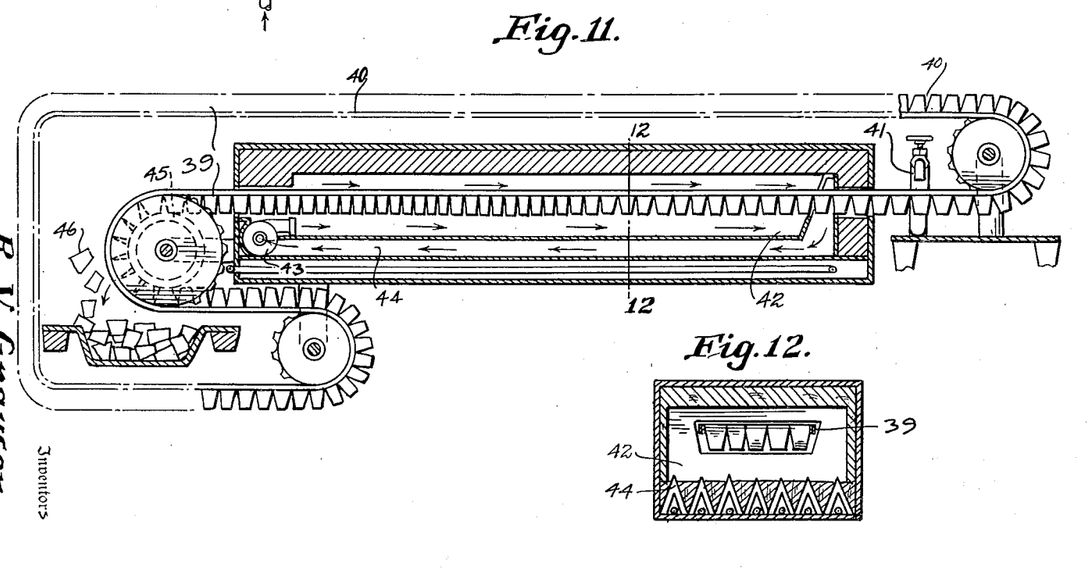
Figure 11 is a longitudinal view partly in section and partly diagrammatic, taken along the line 11—11 of Figure 10.
Figure 12 is a cross section taken along the line 12—12 of Figure 11.
Figure 13:
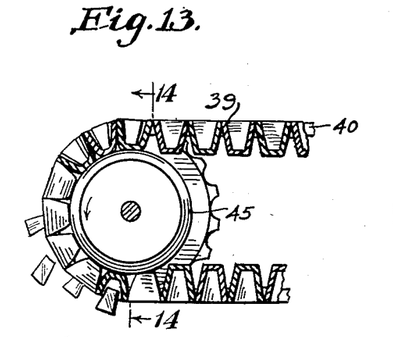
Figure 13 is a vertical section through one end of the molded belt showing the deforming roller.
Figure 14:
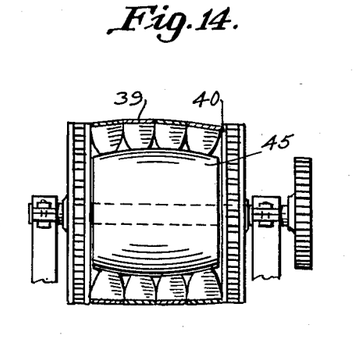
Figure 14 is a section taken along the line 14—14 of Figure 13.

Apparatus for carrying out the freezing of the small units is illustrated in Figures 10 to 19. In Figures 10 and 11, an endless belt conveyor 39 is shown, the same being molded with wells or depressions 40 forming receptacles, receiving the unpackaged product to be frozen which may be charged into them in any suitable manner, as for instance, by means of the conduit 41. The belt conveyor passes through a freezing chamber 42 in which air is preferably substituted for brine, in view of the difficulty of preventing contamination of the exposed product with brine while it is being frozen. The air in the refrigerating chamber is circulated by means of a fan 43 through a multiple of refrigerating tunnels 44, the walls of which may be chilled by suitable means, such as the solid carbon dioxide ice, as illustrated in Figures 1 and 2, or by carbon dioxide snow, formed by the direct expansion of liquefied carbon dioxide in the valleys between the tunnels.

The endless belt beyond the point of its emergence from the freezing chamber passes over a barrel-shaped roller 45, by means of which the belt is distorted transversely, as well as longitudinally, deforming the wells or depressions, ejecting the frozen masses, as is clearly illustrated at 46 in Figure 11. These masses are suitably collected and packed into the bulk container and frozen into an integral whole in the manner already described.

Figure 18:
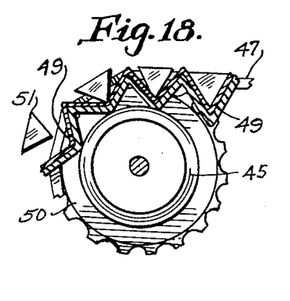
Figure 18 is a section through an end of the belt shown in Figure 17 passing over a deforming roller.
Figure 19:
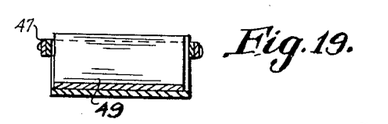
Figure 19 is a front elevation of the deforming roller.

In a modified form of the invention the endless belt is molded with straight sides 47 and 48 (see Fig. 16) and between them, with transverse troughs 49. These troughs may be charged with the product to be frozen and the belt passed through the refrigerating chamber in the same manner as has been described in connection with that form of the invention shown in Figures 10 and 11. The frozen bars of triangular cross section are ejected, as illustrated in Fig. 18 through the action of a deforming roller 50.

Figure 16:
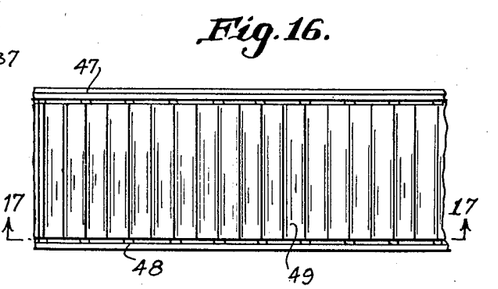
Figure 16 is a plan view through a section of modified form of belting for forming frozen triangular bars.
Figure 17:
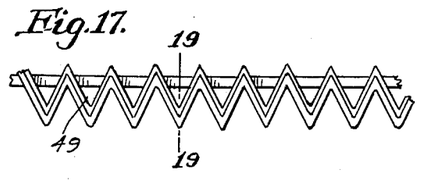
Figure 17 is a vertical section taken along the line 17—17 of Figure 16.

If preferred, the troughs 49 may receive metallic pans 49' formed with troughs which conform to the troughs molded in the belt. These metallic pans, or sections, may be of any desired length and serve not only to keep the product to be frozen from direct contact with the material of the belt, but also reinforce the belt and prevent saging of its sections.

The frozen triangular bars 51 may be packed in bulk containers and by reason of their advantageous shape are enabled to closely fill containers of all shapes, whether round or rectangular.

Figure 20:
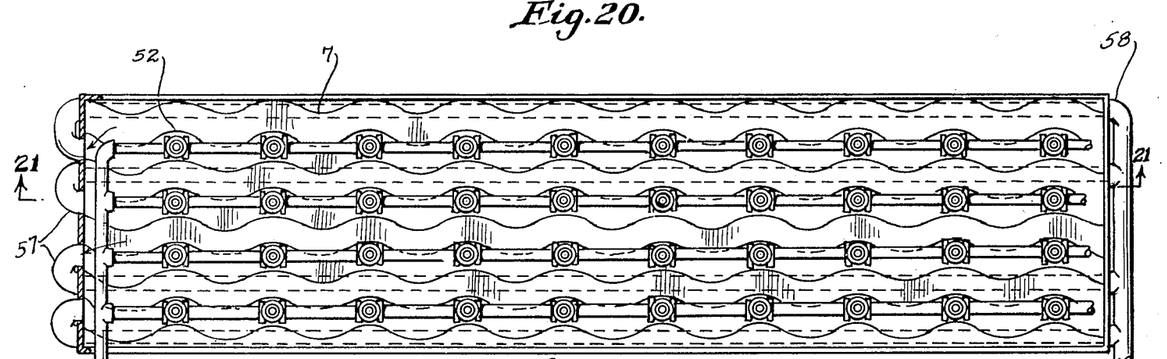
Figure 20 is a plan view of the ripple coil.
Figure 21:
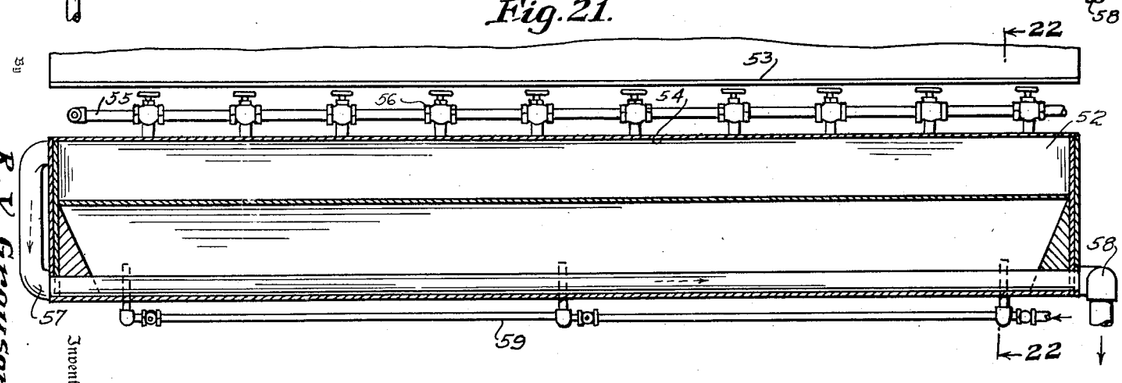
Figure 21 is a vertical section taken along the line 21—21 of Figure 20.

Figures 20 and 21 illustrate a freezing unit in which the tunnels do not extend rectilinearly in a longitudinal direction, but undulate laterally.

Figure 20 shows a series of such tunnels, the undulating lines 52 representing the bottoms of the valleys between said tunnels. A freezing unit of this type has the advantage of not only extending the surface of the tunnel within a given length of unit, but by continually changing the direction of the brine or air circulating through said tunnel, it causes said brine or air to impinge intimately against the walls of said tunnel at the bends, reducing sluggishness of circulation due to skin friction and thus greatly enhancing the heat-exchanging activity of the unit, and this same effect is also produced in the freezing medium, carbon dioxide gas, which may circulate through the valleys on the outside of said tunnels.

Figure 22:
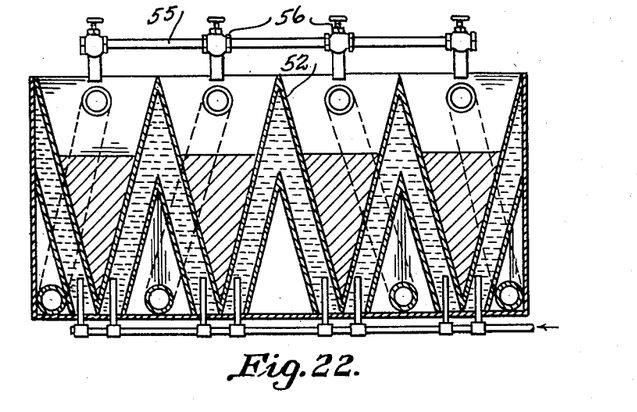
Figure 22 is a section taken along the line 22—22 of Figure 21.
Figure 23:
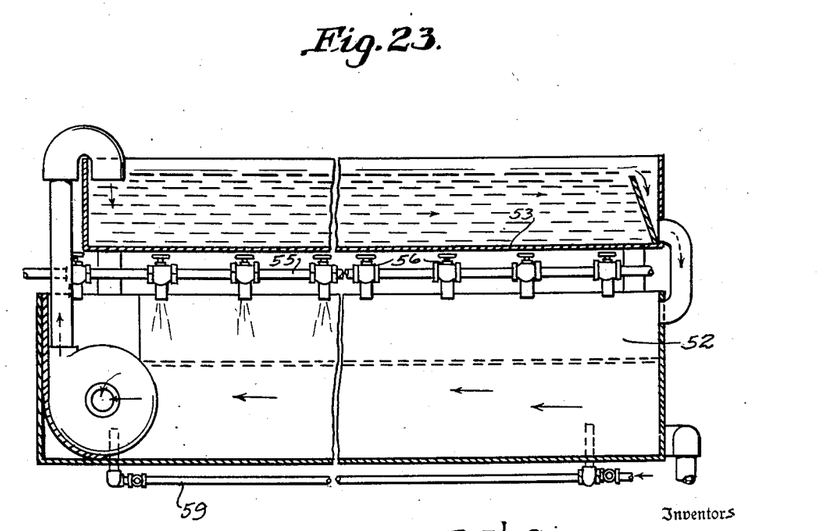
Figure 23 is a vertical section through the system which employs the ripple coil, showing the circulation of brine.

Figures 21 and 22 also illustrate the principles of a system in which the carbon dioxide snow is produced in situ, in the valleys, and the carbon dioxide gas eventuating from the evaporation of said snow collected for the purpose of regeneration. In this phase of the invention the bottom 53 of the brine tank is arranged at a convenient distance above the apices 54 of the triangular tunnels. A system of piping 55 occupies the intervening space, said piping being connected to a source of carbon dioxide gas under pressure, or liquefied carbon dioxide. A plurality of expansion valves 56 are intercalated in the pipe having orifices opening through the top walls 57 of the valleys between the tunnels. Carbon dioxide in liquid or gaseous form is discharged from said orifices into said valleys and immediately changes its state into snow, which evaporating, produces the desired refrigerative effect. The gas resulting from the expansion of the snow traverses the valleys, being pumped therefrom through conduits 57, said conduits returning through the cores of the tunnels and entering a manifold 58 which leads to compressing and condensing apparatus not shown in these figures but which is diagrammatically shown in connection with that form of the invention illustrated in Figure 4.

In all forms of the invention the tunnels may be provided with fins or ribs 58 on the interior of the tunnel walls for further increasing the heat-exchanging efficiency of said tunnels. In the event that freezing of the walls may occur, a system of defrosting pipes 59 may be provided having nozzles entering the brine or air spaces of said tunnels. The piping 59 may be connected to a source supplying a suitable defrosting agent such as calcium chloride. When defrosting is to be practiced, the brine or air flow is cut off from the tunnels and the calcium chloride sprayed upon interior surfaces thereof and from which it may be drained, together with the thawed condensate by suitable means, not shown.

While we have in the above specification described several practical embodiments for carrying out our invention, it is to be understood that the invention concerns itself primarily with a broad concept of quick freezing involving the heat-interchange between carbon dioxide and a circulating medium executing part of its circulatory path through triangular tunnels, and that the details of construction and arrangement of the several units and parts may be varied within wide limits and still be within the scope of the invention as claimed.

What we claim is:

1. Quick freezing system comprising means providing a refrigerating bath, means providing a thawing bath, drying means, and means for transporting packages of the product to be frozen successively through said refrigerating bath and thawing bath and in operative relation to said drying means, at a rate of speed to accomplish freezing of the product in its transit through the refrigerating bath, the transporting means including conveyor racks, each comprising a shield portion intersecting the plane of the level of the brine when in transit therethrough, and fitting in fluid-tight manner about the mouths of said packages, leaving the lower portions of said packages directly exposed to the brine, and upsetting means beyond said drying means engageable by the unit constituted by said rack and packages for effecting the gravital discharge of said packages.

2. Quick freezing system comprising a conduit for a circulating freezing medium, a part of said conduit including tunnels, the adjacent outer walls of which converge downwardly forming a chamber for solid refrigerant.

3. Quick freezing system as claimed in claim 2, the tunnels having a core defining with the outer walls of said tunnels narrow spaces for the passage of the freezing medium.

4. Quick freezing system comprising a conduit for a circulating freezing medium, a part of said conduit including a plurality of tunnels arranged side by side and connected in parallel, said tunnels being of triangular cross section and having their adjacent outer walls converging downwardly forming a chamber for solid refrigerant narrowing toward the bottom whereby the refrigerant maintains engagement with the walls of said chambers notwithstanding its diminution in mass through evaporation, and a conveyor for passing objects to be frozen through another part of said conduit.

5. Quick freezing system comprising a brine tank and a plurality of tunnels connected in parallel to said brine tank at opposite sides, a pump for circulating brine through said tank and tunnels, the walls of said tunnels defining chambers for maintaining solid refrigerant in heat-exchange relation to said brine through said walls.

6. Quick freezing system as claimed in claim 5 including a hollow interior core for said tunnels, and means for conducting evaporated refrigerant from said chambers through said cores.

7. Quick freezing system comprising a conduit for a circulating freezing medium, a part of said conduit including a plurality of tunnels arranged side by side and connected in parallel, said tunnels being of triangular cross section and having their adjacent outer walls converging downwardly forming a chamber for solid refrigerant, said tunnels having a laterally undulating contour.

8. In a freezing system, a refrigerating chamber and a conveyor passing therethrough, said conveyor including racks swingably mounted and adapted to suspend packages of the product to be frozen in exposed state.

9. In a freezing system as claimed in claim 8, the racks having the form of an enclosed chamber, having holes in the bottom through which the major portions of the packages project.

10. Quick freezing system comprising means providing a refrigerating bath, means comprising a thawing bath, and means for transporting packages of the product to be frozen successively through said refrigerating bath and said thawing bath at a rate of speed to accomplish freezing of the product in its transit through the refrigerating bath, said transporting means including a conveyor and racks forming parts of said conveyor for suspending said packages in said baths.

11. Quick freezing system comprising means providing a refrigerating bath, means comprising a thawing bath, and means for transporting packages of the product to be frozen successively through said refrigerating bath and said thawing bath at a rate of speed to accomplish freezing of the product in its transit through the refrigerating bath, said transporting means including conveyor racks, each comprising a shield portion intersecting the plane of the level of the brine when in transit there-across, and fitting in fluid-tight manner about the mouths of said packages, leaving the lower portions of said packages directly exposed to the brine.

12. Quick freezing system comprising means providing a refrigerating bath, means comprising a thawing bath, and means for transporting packages of the product to be frozen successively through said refrigerating bath and said thawing bath at a rate of speed to accomplish freezing of the product in its transit through the refrigerating bath, said transporting means including conveyor racks each comprising a shield portion intersecting the plane of the level of the brine when in transit therethrough, and fitting in fluid-tight manner about the mouths of said packages, leaving the lower portions of said packages exposed to the brine, and hinged lid closing said shield portions.

13. Quick freezing system comprising means providing a refrigerating bath, means comprising a thawing bath, and means for transporting packages of the product to be frozen successively through said refrigerating bath and said thawing bath at a rate of speed to accomplish freezing of the product in its transit through the refrigerating bath, said transporting means including conveyor racks each comprising a shield portion intersecting the plane of the level of the brine when in transit therethrough, and fitting in fluid-tight manner about the mouths of said packages, leaving the lower portions of said packages directly exposed to the brine, and upsetting means beyond said thawing means engageable by the unit constituted by said rack and packages for effecting the gravital discharge of said packages from said racks.

14. Quick freezing system comprising means providing a refrigerating bath, means comprising a thawing bath, and means for transporting packages of the product to be frozen successively through said refrigerating bath and said thawing bath at a rate of speed to accomplish freezing of the product in its transit through the refrigerating bath, said transporting means including conveyor racks, each comprising a shield portion, and fitting in fluid-tight manner about the mouths of said packages, leaving the lower portions of said packages directly exposed to the brine.

15. Quick freezing system comprising a conduit for a circulating freezing medium, a part of said conduit including tunnels, the adjacent outer walls of which converge downwardly forming a chamber for solid refrigerant, the walls of said tunnels having a laterally undulating contour.

16. Quick freezing system as claimed in claim 15, the tunnels having a core defining with the outer walls of said tunnels narrow spaces for the passage of the freezing medium.

17. Quick freezing system comprising a brine tank and a plurality of tunnels connected in parallel to said brine tank at opposite sides, a pump for circulating brine through said tank and tunnels, the walls of said tunnels defining chambers for maintaining solid refrigerant in heat exchanging relation to said brine through said walls, the latter having a laterally undulating contour.

RALPH V. GRAYSON.
EDGAR G. BALLENGER.